Patented Dec. 8, 1925.

1,564,774

UNITED STATES PATENT OFFICE.

LOUIS T. FREDERICK, OF VALPARAISO, INDIANA, ASSIGNOR TO FIBROC INSULATION COMPANY, OF VALPARAISO, INDIANA, A CORPORATION OF INDIANA.

COMPOSITE MATERIAL FOR GEARS AND THE LIKE.

No Drawing. Application filed January 26, 1924. Serial No. 688,865.

*To all whom it may concern:*

Be it known that I, LOUIS T. FREDERICK, a citizen of the United States, residing at Valparaiso, in the county of Porter and State of Indiana, have invented a certain new and useful Improvement in Composite Materials for Gears and the like, of which the following is a specification.

Fiber gears are known articles of commerce. Basically they consist of bodies composed of fiber, either woven or unwoven, held together firmly and cut to form gears. The most common practice at the present time for holding the fiber together in a solid body is to impregnate it with a phenol resin or similar condensation product which will harden under the action of heat and pressure. One of the commonest methods for making fiber gears is to take the fiber in the form of a woven fabric as, for example, cotton duck, saturate it in the resin, place a plurality of layers of the saturated fabric in a pile—usually in disc form—then place in a hot press and subsequently machine the teeth. The gears thus formed may be with or without shrouds.

Gears made in the described manner with phenol resin have to be lubricated when in use in practically the same manner as metallic gears. Theoretically, gear teeth roll one on the other. Yet as a practical matter, on account of vibration, thrust and wear there is considerable rubbing of surfaces and a constant wearing of the teeth. Synthetic resins or condensates apparently have no characteristic of self-lubrication, and the result is, as above stated, that these fiber gears require lubrication in the same manner as ordinary metallic gears.

One object of my invention is to provide gear material which will avoid the need of lubrication entirely or partially. Another object of my invention is to provide a material of this nature which reduces the tendency to dull the tools by which it is machined.

I accomplish these objects by introducing graphite into the body of the gear material itself.

I have found that a remarkable lubricating effect is obtained without weakening the material by employing five per cent by weight of graphite. It may be incorporated in different ways but I have obtained excellent results by mixing the graphite with the resin solution, or varnish, which serves as a binder.

Another advantage of the material of my invention is that in machining it reduces the tendency to dull the tools. Harder resins can therefore be used to an extent to improve the mechanical strength several thousand pounds per square inch.

Thus the incorporation of the graphite produces a gear which needs little or no lubrication under ordinary circumstances, has less tendency to dull the tools by which it is machined and makes it practicable to employ a harder resin and obtain a product having greater mechanical strength.

A desirable gear material is obtained by causing it to finally contain about 50% fibrous material, 45% phenol resin, and 5% graphite.

Having thus described my invention, what I claim as new and desire to secure by Letters Patent is:

1. A self-lubricating laminated composite material of high mechanical strength and free from fusible constituents comprising woven fabric arranged in layers and impregnated with a phenolic condensation product capable of hardening under heat and pressure, and graphite incorporated in said material, and constituting not to exceed 5 per cent. of the total weight of the material.

2. A laminated composite gear material comprising woven fabric about 50% by weight, condensation product about 45% and graphite about 5%.

In witness whereof, I have hereunto subscribed my name.

LOUIS T. FREDERICK.